(12) United States Patent
Dang et al.

(10) Patent No.: US 8,497,617 B2
(45) Date of Patent: Jul. 30, 2013

(54) STATORS WITH IMPROVED CONDUCTOR ASSEMBLY AND METHOD OF MAKING SAME

(75) Inventors: Dang Dinh Dang, Garden Grove, CA (US); Rolf Blissenbach, Rolling Hills Estates, CA (US); David Schauer, New Ulm, MN (US); John Wattleworth, Mankato, MN (US); Michael Milani, Rancho Palos Verdes, CA (US); Erik Hatch, Cypress, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 12/503,623

(22) Filed: Jul. 15, 2009

(65) Prior Publication Data

US 2011/0012471 A1  Jan. 20, 2011

(51) Int. Cl.
*H02K 3/00* (2006.01)

(52) U.S. Cl.
USPC ............................. 310/201; 310/208; 310/215

(58) Field of Classification Search
USPC .................... 310/215, 201–208; 29/605, 606
See application file for complete search history.

(56) References Cited

U.S. PATENT DOCUMENTS

| 6,501,205 B1 * | 12/2002 | Asao et al. | 310/184 |
| 6,674,211 B2 * | 1/2004 | Katou et al. | 310/215 |
| 6,707,211 B2 * | 3/2004 | Oohashi et al. | 310/179 |
| 6,750,582 B1 * | 6/2004 | Neet | 310/208 |

FOREIGN PATENT DOCUMENTS

CN        1489259 A      4/2004

OTHER PUBLICATIONS

Chinese Office Action, dated Jun. 25, 2012, for Chinese Patent Application No. 201010231818.6.
China Patent & Trademark Office, Office Action in China Patent Application No. 201010231818.6, mailed Mar. 22, 2013.

* cited by examiner

*Primary Examiner* — Dang Le
(74) *Attorney, Agent, or Firm* — Ingrassia Fisher & Lorenz, P.C.

(57) ABSTRACT

A stator includes a stator core, a plurality of slots, and a conductor. The plurality of slots are formed within the stator core. The conductor is disposed continuously within at least two of the plurality of openings.

20 Claims, 8 Drawing Sheets

US 8,497,617 B2

STATORS WITH IMPROVED CONDUCTOR ASSEMBLY AND METHOD OF MAKING SAME

STATEMENT REGARDING FEDERALLY SPONSORED RESEARCH OR DEVELOPMENT

This invention was made with Government support under Integrated Traction Drive System for HEV, PHEV, FCV (DE-FC26-07NT43123), awarded by the US-Department of Energy. The Government has certain rights in this invention.

TECHNICAL FIELD

The present invention generally relates to the field of vehicular electric motors and, more specifically, to stators with an improved conductor assembly for use in vehicular electric motors and to a method for manufacturing such stators.

BACKGROUND OF THE INVENTION

Advances in technology have led to significant changes in the design of automobiles. One of these changes involves the complexity, as well as the power usage, of various electrical systems within automobiles, particularly alternative fuel vehicles. For example, alternative fuel vehicles such as hybrid vehicles often use electrochemical power sources, such as batteries, ultracapacitors, and fuel cells, to power the electric motors (or motors) that drive the wheels, sometimes in addition to another power source, such as an internal combustion engine.

Electric motors typically include a rotor that rotates on a shaft within a stationary stator assembly. The rotor and stator assemblies each generate magnetic fields that interact with each other to cause the rotor to rotate and produce mechanical energy. The stator assembly typically includes a core having multitude of ferromagnetic annular layers (or laminations) arranged as a stack. Each lamination has several slots that, when aligned, form axial pathways that extend through the length of the core. Conductive elements such as rods, wires, or the like, typically made from copper or a copper alloy, are wound around the lamination core through these openings. Current passing through these conductors driven by a power source such as a battery or fuel cell generates electromagnetic flux that can be modulated as needed to control the speed of the motor.

In a typical bar wound stator assembly, different wires or other conductors are inserted separately into each slot. The conductors are typically bent, coupled together, and welded together after they are inserted into the openings. However, this can consume result in time, cost, and effort in manufacturing the stator assembly, and/or in a stator with a larger number of welding locations than is optimal.

Accordingly, it is desirable to provide an improved stator, for example with a decreased number of welding locations. It is also desirable to provide an improved method for manufacturing a stator, for example that can result in less time, cost, and/or effort. It is further desirable to provide an electric motor with such an improved stator. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a stator is provided. The stator comprises a stator core, a plurality of slots, and conductor. The plurality of slots are formed within the stator core. The conductor is disposed continuously within at least two of the plurality of openings.

In accordance with another exemplary embodiment of the present invention, a method for method for manufacturing a stator is provided. The method comprises the steps of providing a stator core, forming a plurality of slots within the stator core, and sliding a conductor into the stator core such that the conductor extends continuously through at least two of the plurality of slots.

In accordance with a further exemplary embodiment of the present invention, an electric motor configured to be used in connection with a vehicle is provided. The electric motor comprises a rotor and a stator. The stator is magnetically coupled to the rotor, and comprises a stator core, a plurality of slots, and a plurality of wires. The plurality of slots are formed within the stator core. The plurality of wires are disposed within the stator core. At least one of the wires is disposed continuously within two of the plurality of slots.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
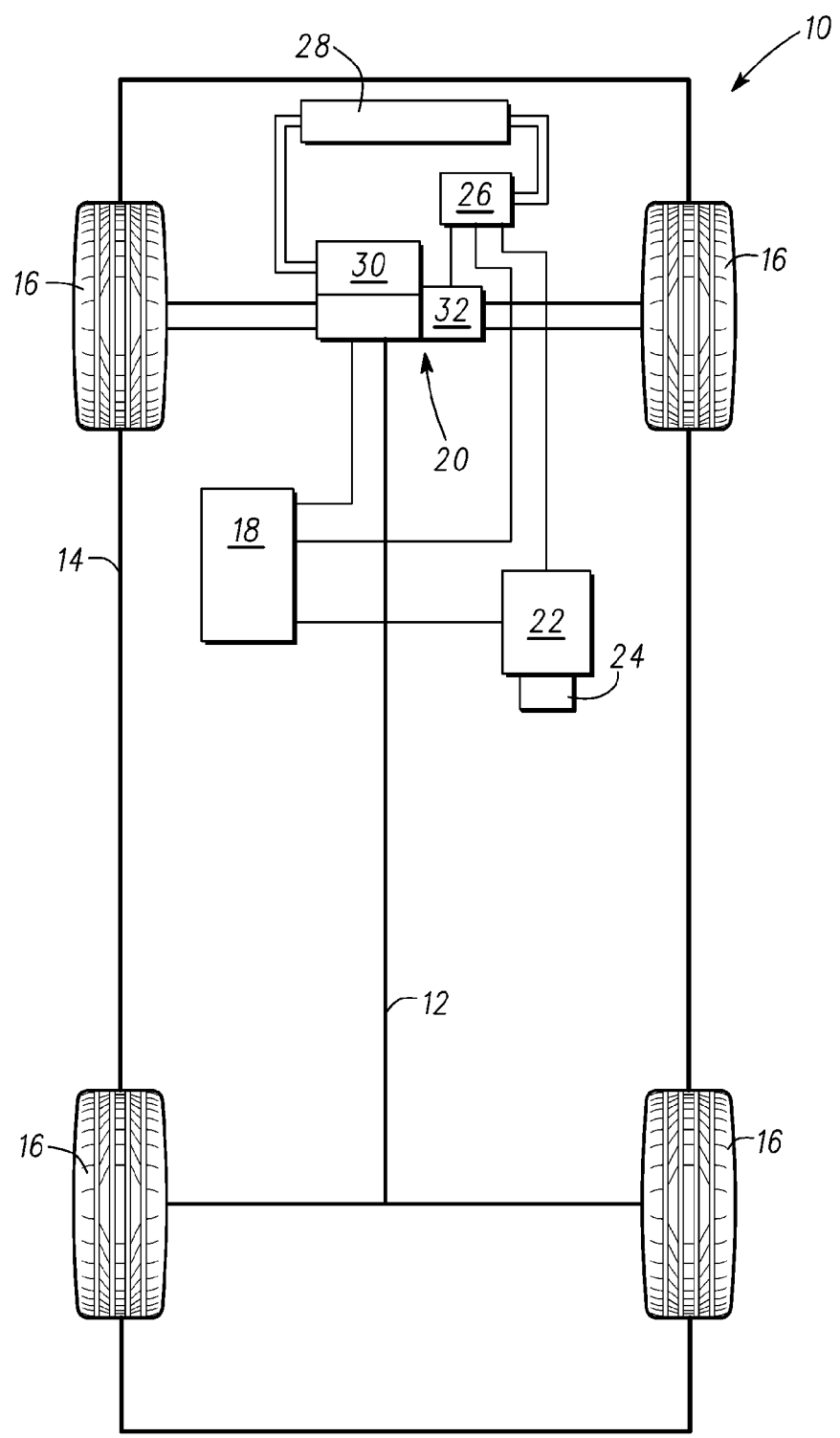
FIG. 1 is a schematic diagram of an exemplary vehicle illustrating a manner in which an embodiment is integrated with various sub-components of the vehicle in accordance with an exemplary embodiment.

FIG. 1 is a schematic diagram of an exemplary vehicle 10, such as an automobile, according to one embodiment of the present invention. The automobile 10 includes a chassis 12, a body 14, four wheels 16, and an electronic control system (or electronic control unit (ECU)) 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 10 is a hybrid vehicle, and further includes an actuator assembly (or powertrain) 20, a battery array 22, a battery state of charge (SOC) system 24, a power electronics bay (PEB) 26, and a radiator 28. The actuator assembly 20 includes an internal combustion engine 30 and an electric motor 32. The battery array 22 is electrically coupled to PEB 26 and, in one embodiment, comprises a lithium ion (Li-ion) battery including a plurality of cells, as is commonly used. Electric motor 32 typically includes a plurality of electric components, including stator and rotor assemblies. The stator assembly includes an annular core containing a multitude of annular core laminations, and a plurality of conductors (or conductive elements) extending through these laminations. At least one pair of these conductive elements is electrically isolated from adjacent conductive elements and core laminations by an insulating layer configured in accordance with an exemplary embodiment of the invention. The insulating layer substantially circumscribes the peripheries of the pair of conductive elements and provides a continuous insulating barrier between the conductive elements and other stator core elements.

Figure 2:
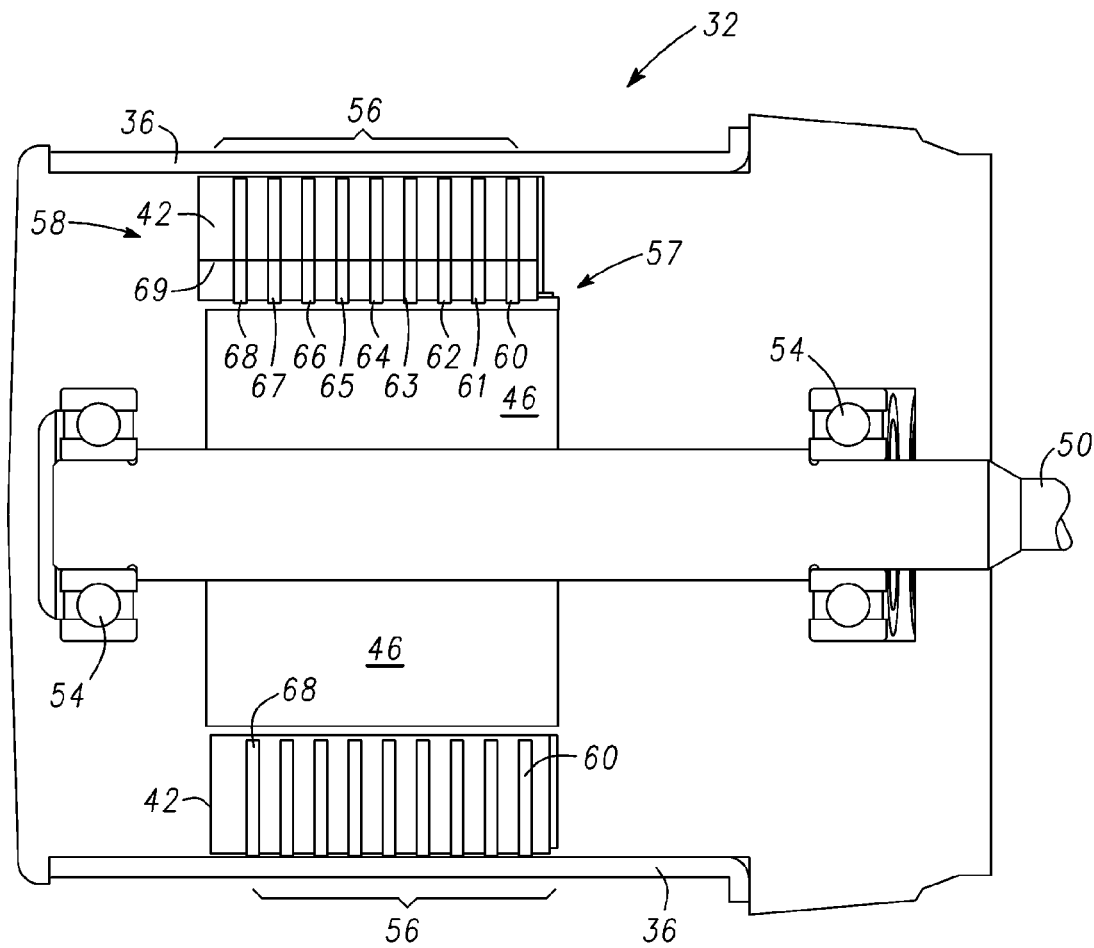
FIG. 2 is a cross-sectional side view of an exemplary vehicular electric motor for use with the vehicle depicted in FIG. 1, in accordance with an exemplary embodiment.

FIG. 2 is a cross-sectional side view of an electric motor 32, in accordance with an exemplary embodiment. It should be noted that many detailed elements commonly found in such an electric motor have been omitted for greater clarity. The electric motor 32 includes a housing 36, a stator assembly 42, a rotor 46, and a shaft 50. The stator assembly 42 is contained within and fixedly coupled to housing 36. The rotor 46 is fixedly coupled to shaft 50, both elements configured for rotation within stator assembly 42 about an axis of rotation A-A'. A set of bearings 54 is coupled to the housing 36 proximate either end thereof, and provide support for, and rotational coupling to, the shaft 50. The stator assembly 42 also includes a stator 56 having a first end 57 and a second end 58, and having a plurality of individual annular laminations 60-68 arranged parallel to each other in a stacked, columnar array between these ends. Each individual lamination has at least one slot (or channel) aligned with like slots in each lamination throughout stator 56. The aligned slots form an axial (substantially parallel to axis of rotation A-A') pathway through the stator 56 that may contain a different number of conductive elements (represented by a conductive element 69) electrically isolated from other elements within the stator 56 by an insulating layer to be described in greater detail below. During operation, current flows through the conductive element 69 of the stator 56, generating magnetic flux that interacts with flux emanating from rotor 46. The flux interaction between stator 56 and rotor 46 causes the rotor 46 to rotate with the shaft 50 about axis A-A' generating mechanical energy thereby.

Figure 3:
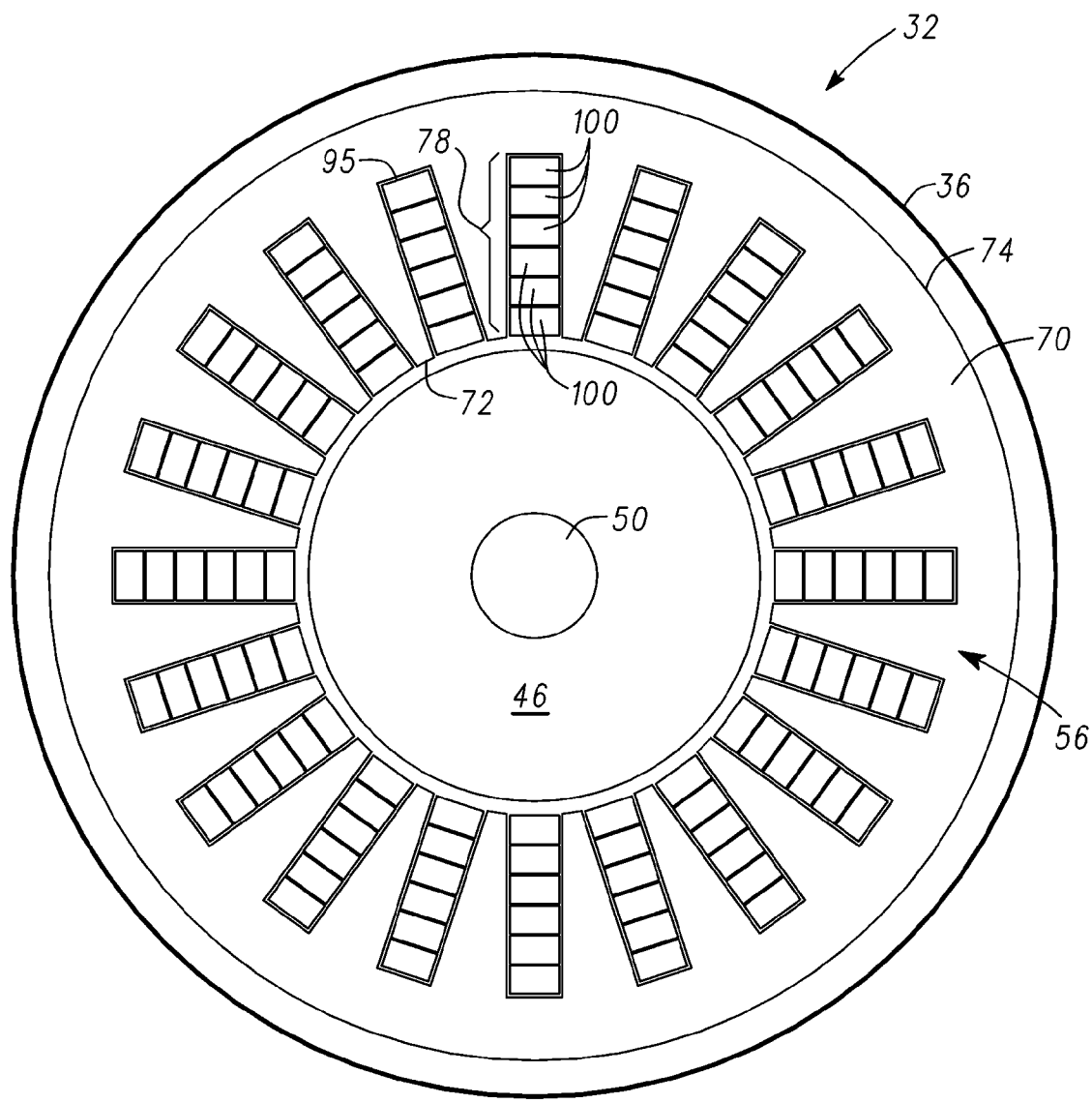
FIG. 3 is a cross-sectional front view of the exemplary vehicular electric motor depicted in FIG. 2, in accordance with an exemplary embodiment.

FIG. 3 is a cross-sectional front view of the electric motor 32, in accordance with an exemplary embodiment. The electric motor 32 includes the housing 36, the stator 56, the rotor 46, and the shaft 50. The stator 56 is circumscribed about the rotor 46, and is fixedly coupled to the housing 36. The shaft 50 is rotationally coupled to and supported by the bearings 54 (FIG. 2). The rotor 46 rotates with the shaft 50 substantially concentrically within the stator 56. The stator 56 includes a stator core 70. The stator core 70 preferably comprises a stack lamination proximate a first end 57 thereof (FIG. 2) having a ferromagnetic annulus with an inner circumferential surface 72 substantially concentric within an outer circumferential surface 74. The stator core 70 also includes a plurality of slots 78 merged with the inner circumferential surface 72, and aligned with similarly arranged slots in the stator core 70, with each of the slots 78 extending generally around the inner circumferential surface 72. While only twenty slots 78 are depicted in FIG. 3 for illustrative purposes, it is understood that, depending upon the overall design of the electric motor 32, that the stator core 70 may contain a different number of slots 78.

Six conductive elements 100 (referenced hereafter as conductors 100) are disposed within each of the slots 78, and extend the length of stator 56 substantially axially aligned with one another. While six such conductors 100 are described and illustrated in FIG. 3 as extending through each slot 78, it is understood that each slot 78 may contain a different number of such conductors 100. Each conductor 100 may assume any form such as that of a rod, a wire, a tube, or the like, having a suitable cross-sectional shape such as, for example, substantially rectangular or circular. The conductors 100 are made of an electrically conducting material such as, for example, copper or an alloy of copper.

In a preferred embodiment, the conductors 100 are coated with a suitable non-conducting coating to provide electrical isolation from other adjacent elements including liners 95 surrounding each of the conductors 100. During operation, current flows through the conductor 100 in each slot 78, generating magnetic flux thereby. Pairings of conductive elements are surrounded by an electrically insulating layer that protects each individual conductive element from shorting to adjacent conductive elements and stator core surfaces.

Each of the conductors 100 is preferably insulated and separated from one another by the liners 95. In addition, each conductor 100 is continuously disposed within and extends continuously through two or more slots 78 of the stator core 70. As described in greater detail further below in connection with FIGS. 5-9, in a most preferred embodiment, each conductor 100 is disposed continuously within and extends continuously through four slots 78 of the stator core 70.

Figure 4:
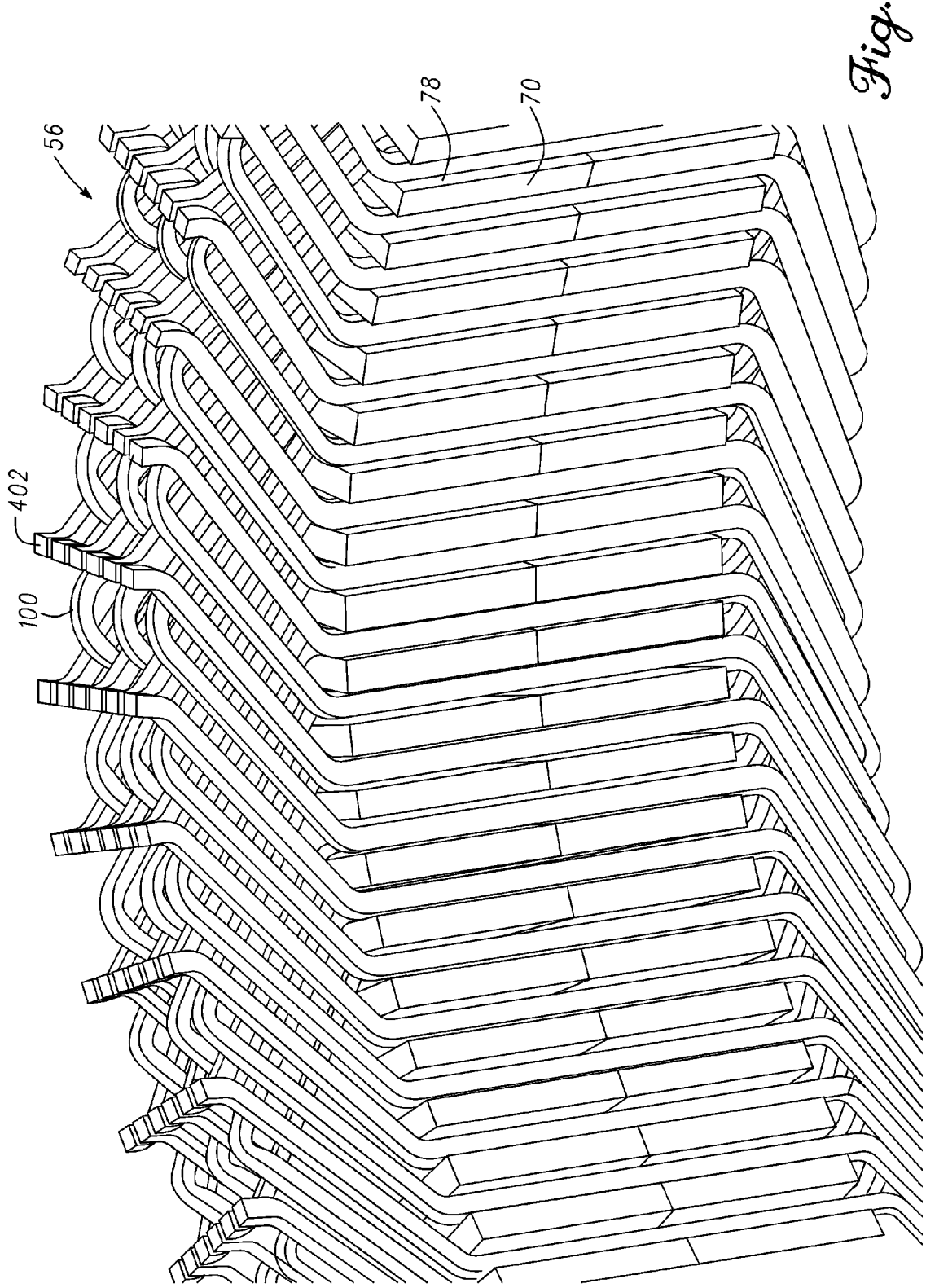
FIG. 4 is an isometric view of a portion of a stator of FIG. 3, in accordance with an exemplary embodiment.

FIG. 4 is an isometric view of a portion of the stator 56 of FIG. 3, in accordance with an exemplary embodiment. In a preferred embodiment, as depicted in FIG. 4 as well as in FIGS. 5-7, the stator core 70 and the slots 78 are manufactured and configured such that the geometry of each of the slots 78 is open to allow for easy insertion of pairs or groups of conductors 100 therein. However, this may vary in other embodiments.

In the depicted embodiment, each conductor 100 is disposed continuously within and extends continuously through four of the slots 78. In other embodiments, some or all of the conductors 100 are disposed continuously within and extend continuously through a different number of slots 78. In any case, preferably each of the conductors 100 comprises a continuous conductor that is disposed continuously within and extends continuously through two or more of the slots 78.

The conductors 100 preferably can be categorized into various different pluralities of conductors 100, with each different plurality of conductors 100 having a particular phase associated with them. Each plurality of conductors 100 of a common phase are coupled together with a serial connection and are welded together at various welding locations 402.

Figure 5:
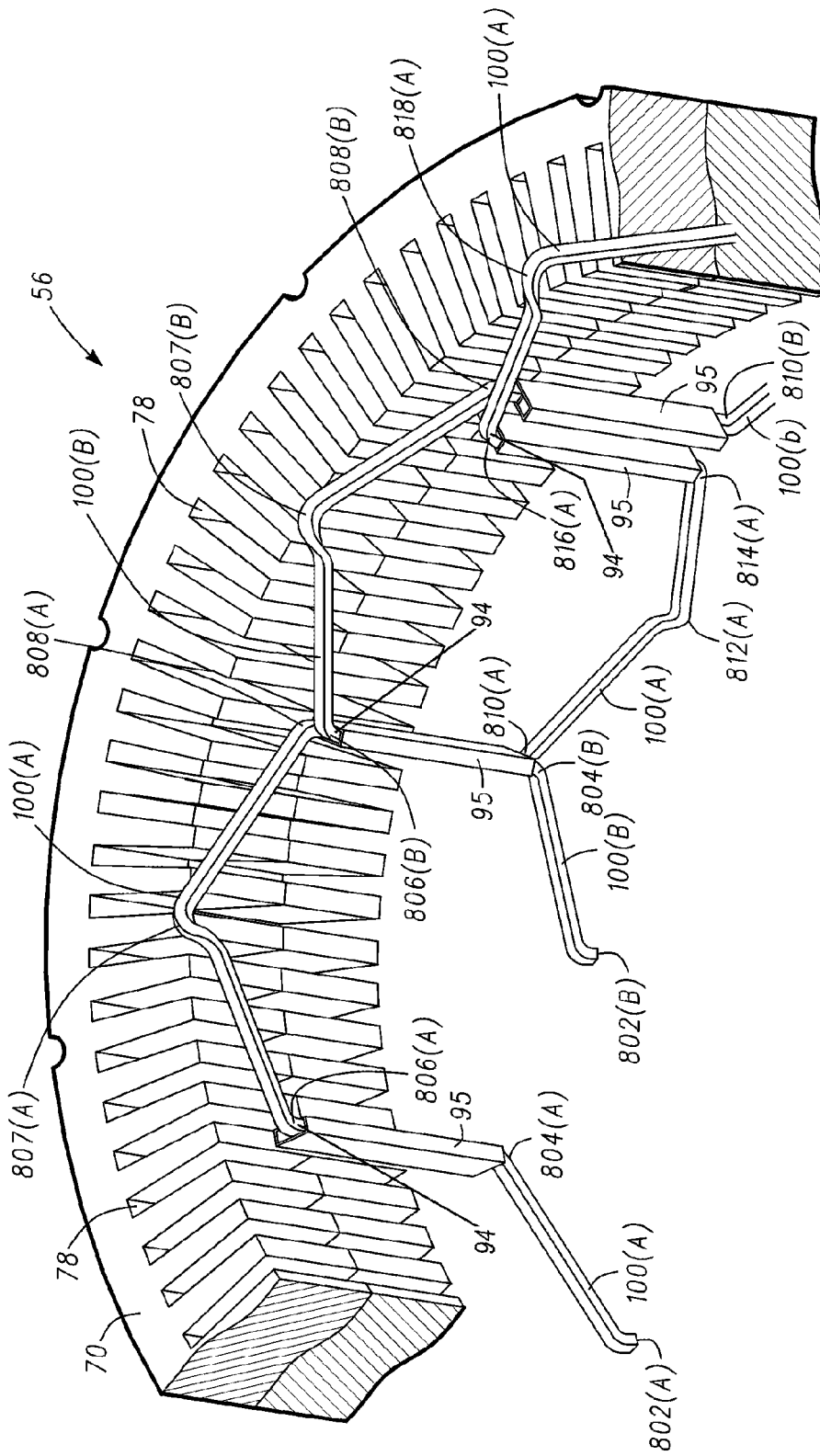
FIG. 5 is an isometric view of a portion of the stator of FIG. 3, shown at a point in time prior to insertion of exemplary conductors thereof, and shown in conjunction with portions of two exemplary conductors, in accordance with another exemplary embodiment.
Figure 6:
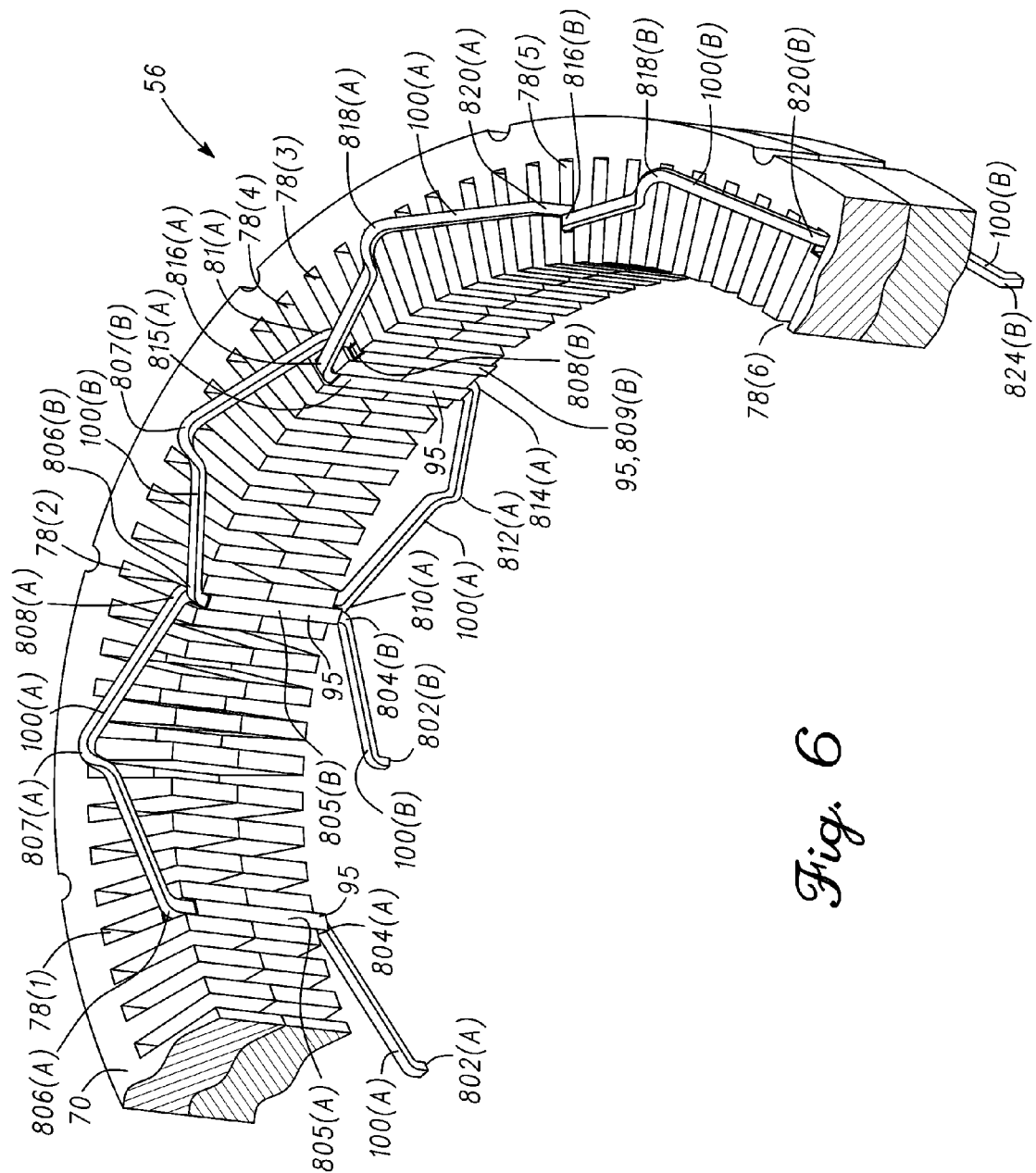
FIG. 6 is an isometric view of a portion of the stator of FIG. 3, shown at a point in time during insertion of the exemplary conductors of FIG. 5, and shown in conjunction with portions of the exemplary conductors of FIG. 5, in accordance with another exemplary embodiment.
Figure 7:
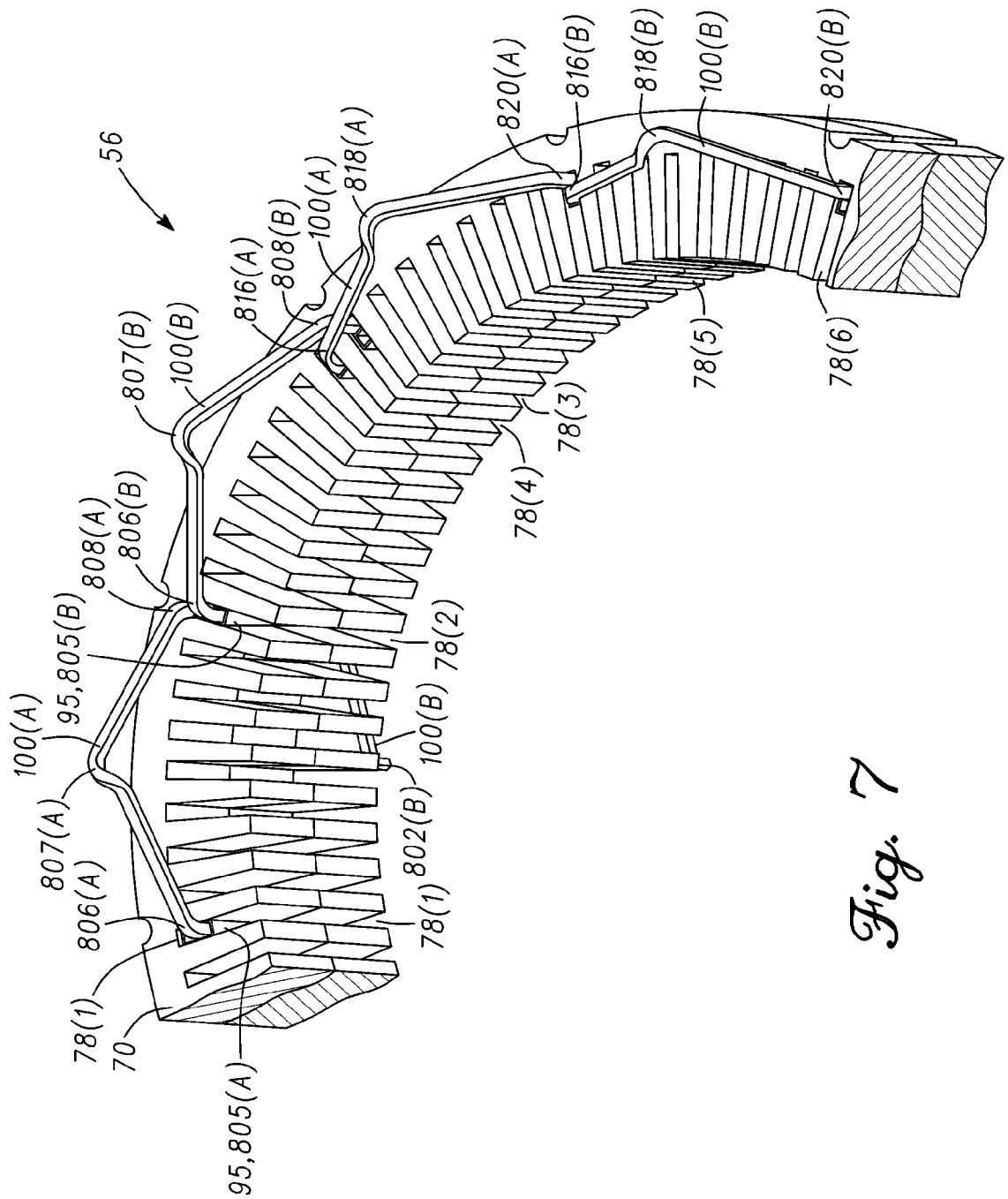
FIG. 7 is an isometric view of a portion of the stator of FIG. 3, shown at a point in time following insertion of the exemplary conductors of FIG. 5, and shown in conjunction with portions of the exemplary conductors of FIG. 5, in accordance with another exemplary embodiment.

FIGS. 5-7 are isometric views of a portion of the stator 56 of FIG. 3, shown at different points in time during manufacture of the stator 56. Specifically, (i) FIG. 5 is an isometric view of a portion of the stator 56 of FIG. 3 shown at a point in time prior to insertion of two exemplary conductors 100(A) and 100(B) thereof; (ii) FIG. 6 is an isometric view of a portion of the stator 56 of FIG. 3 shown at a point in time during insertion of the two exemplary conductors 100(A) and 100(B) of FIG. 5; and (iii) FIG. 7 is an isometric view of a portion of the stator 56 of FIG. 3 shown at a point in time following insertion of the two exemplary conductors 100(A) and 100(B) of FIGS. 5 and 6. FIGS. 5-7 are also discussed in connection with FIG. 8, which depicts an exemplary conductor 100, such as one of the conductors 100(A) and 100(B) of FIGS. 5-7, in isolation.

Figure 8:
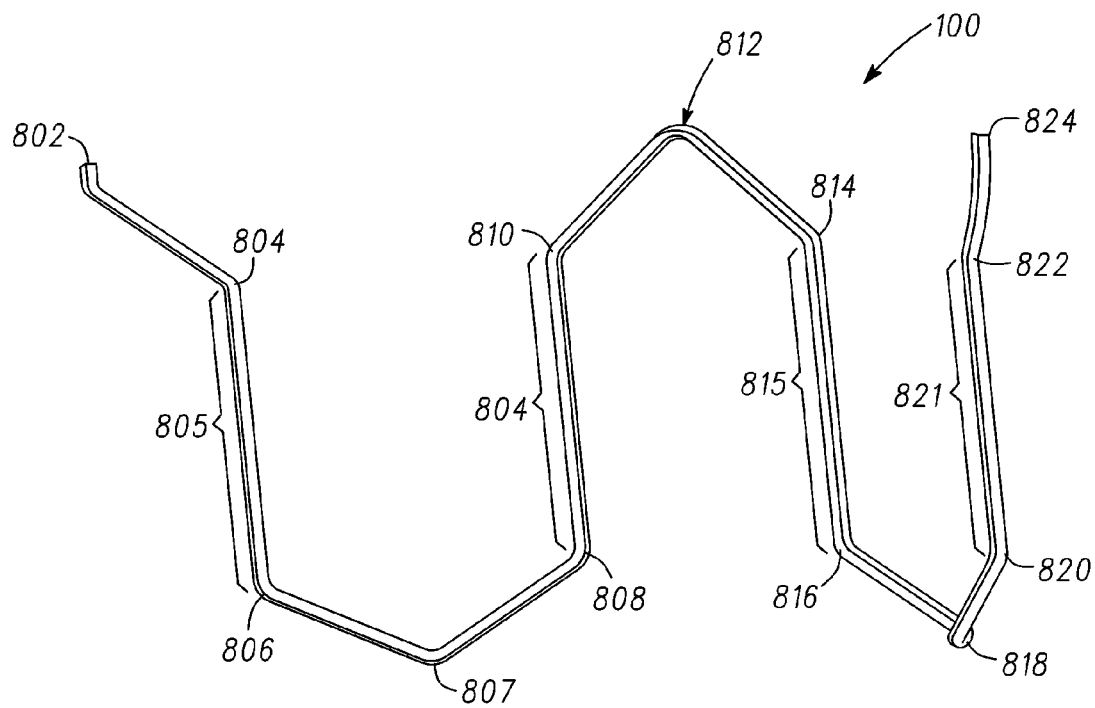
FIG. 8 is an isometric view of an exemplary conductor of the stator of FIG. 3 and of the portions thereof of FIGS. 4-7, in accordance with another exemplary embodiment.

As shown in FIGS. 5-8, in a preferred embodiment, each conductor 100 includes a first end 802 configured to be coupled to another conductor 100, preferably by twisting and welding. As shown in FIG. 8, each conductor 100 is preferably bent in proximity to the first end 802.

Each conductor 100 also preferably has a first linear portion 805 (see FIG. 8) extending between first bends 804 and 806 of the conductor 100. The first linear portion 805 is surrounded by a liner 95 (see FIGS. 5-7), and is inserted into and subsequently disposed within a first slot 78 of the stator core 70. For example, with respect to the first conductor 100(A) of FIGS. 5-7, the first linear portion 805(A) is surrounded by a liner 95 and inserted into slot 78(1) of FIGS. 6 and 7. In addition, with respect to the second conductor 100(B) of FIGS. 5-7, the first linear portion 805(B) is surrounded by a separate liner 95 and inserted into slot 78(2) of FIGS. 6 and 7. In addition, as shown in FIG. 5, each liner 95 is disposed outward of, and surrounds an outer coating 94 of portion of the conductor that is surrounded by the liner 95.

Each conductor 100 also preferably has a second linear portion 809 (see FIG. 8) extending between second bends 808 and 810 of the conductor 100. The second linear portion 809 is preferably surrounded by a separate liner 95, and is inserted into and subsequently disposed within a second slot 78 of the stator core 70. For example, with respect to the first conductor 100(A) of FIGS. 5-7, the second linear portion 809(A) is surrounded by a liner 95 and inserted into slot 78(2) of FIGS. 6 and 7. In addition, with respect to the second conductor 100(B) of FIGS. 5-7, the second linear portion 809(B) is surrounded by a separate liner 95 and inserted into slot 78(3) of FIGS. 6 and 7.

Each conductor 100 also preferably has a third linear portion 815 (see FIG. 8) extending between third bends 814 and 816 of the conductor 100. The third linear portion 815 is preferably surrounded by a separate liner 95, and is inserted into and subsequently disposed within a third slot 78 of the stator core 70. For example, with respect to the first conductor 100(A) of FIGS. 5-7, the third linear portion 815(A) is surrounded by a liner 95 and inserted into slot 78(4) of FIGS. 6 and 7. In addition, with respect to the second conductor 100(B) of FIGS. 5-7, the third linear portion 815(B) is surrounded by a separate liner 95 and inserted into slot 78(5) of FIGS. 6 and 7.

Each conductor 100 also preferably has a fourth linear portion 821 (see FIG. 8) extending between fourth bends 820 and 822 of the conductor 100. The fourth linear portion 821 is preferably surrounded by a separate liner 95, and is inserted into and subsequently disposed within a fourth slot 78 of the stator core 70. For example, with respect to the first conductor 100(A) of FIGS. 5-7, the fourth linear portion 821(A) is surrounded by a liner 95 and inserted into slot 78(5) of FIGS. 6 and 7. In addition, with respect to the second conductor 100(B) of FIGS. 5-7, the fourth linear portion 821(B) is surrounded by a separate liner 95 and inserted into slot 78(6) of FIGS. 6 and 7.

As depicted in FIGS. 5-8, each conductor 100 preferably also includes various additional bends. Specifically, each conductor 100 preferably includes a first additional bend 807 between bends 806 and 808, and that is inserted between the first and second slots 78 in which the conductor 100 is inserted. For example, with respect to the first conductor 100(A) of FIGS. 5-7, the first additional bend 807(A) is inserted between slots 78(1) and 78(2) of FIGS. 6 and 7. In addition, with respect to the second conductor 100(B) of FIGS. 5-7, the first additional bend 807(B) is inserted between slots 78(2) and 78(3) of FIGS. 6 and 7.

Each conductor 100 preferably also includes a second additional bend 812 between bends 810 and 814, and that is inserted between the second and third slots 78 in which the conductor 100 is inserted. For example, with respect to the first conductor 100(A) of FIGS. 5-7, the second additional bend 812(A) is inserted between slots 78(2) and 78(4) of FIGS. 6 and 7. In addition, with respect to the second conductor 100(B) of FIGS. 5-7, the second additional bend 812(B) (not depicted in FIGS. 5-7) would be inserted between slots 78(3) and 78(5) of FIGS. 6 and 7.

Each conductor 100 preferably also includes a third additional bend 818 between bends 816 and 820, and that is inserted between the third and fourth slots 78 in which the conductor 100 is inserted. For example, with respect to the first conductor 100(A) of FIGS. 5-7, the third additional bend 818(A) is inserted between slots 78(4) and 78(5) of FIGS. 6 and 7. In addition, with respect to the second conductor 100(B) of FIGS. 5-7, the third additional bend 818(B) is inserted between slots 78(5) and 78(6) of FIGS. 6 and 7.

Also as depicted in FIGS. 5-8, in a preferred embodiment, each conductor 100 also includes a second end 824 configured to be coupled to another conductor 100, preferably by twisting and welding. As shown in FIG. 8, each conductor 100 is preferably bent in proximity to the second end 824.

In the depicted embodiment, each conductor 100 is twisted or bent thirteen times before being inserted into four different slots 78 of the stator core 70. The conductor 100 of FIG. 8 is bent or twisted more times than a conductor in a typical stator because the conductor 100 of FIG. 8 is disposed continuously in four different slots 78 instead of in a single slot. Accordingly, the number of wire couplings and welds is reduced in the exemplary embodiment as compared with the number of welds required with a typical stator having six conductors per slot. In one such exemplary embodiment, the average number of conductor couplings and welds is reduced by close to fifty percent as compared with a traditional stator.

In the embodiment depicted in FIGS. 5-7, the first and second conductors 100(A) and 100(B) are disposed in certain common or shared slots 78, such as slots 78(2) and 78(5) (in which conductors 100(A) and 100(B) are both disposed), in addition to certain non-common or non-shared slots 78, such as slots 78(1) and 78(4) (in which conductor 100(A) is disposed) and slots 78(3) and 78(6) (in which conductor 100(B) is disposed). However, this may vary in other embodiments. For example, in certain embodiments, various pairs of conductors 100 may be disposed within slots 78 that are each common to one another. It will similarly be appreciated that the different slots 78 occupied by a particular conductor 100 may be spaced apart differently as compared with FIGS. 5-7 and/or as compared with other conductors 100 of the stator 56, among other possible variations in different embodiments.

Figure 9:
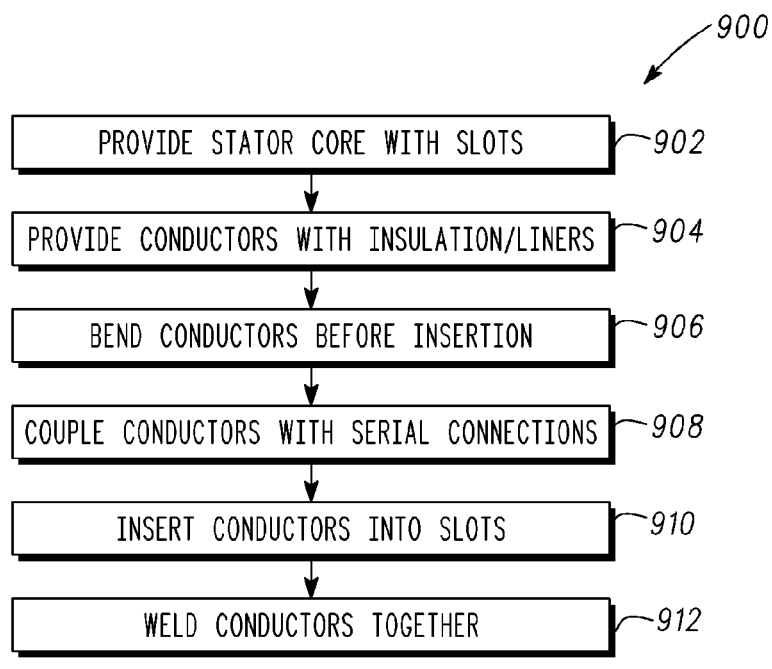
FIG. 9 is a flowchart of a process for manufacturing a stator, such as the stator of FIG. 3 and the portions thereof of FIGS. 4-8, in accordance with an exemplary embodiment.

FIG. 9 is a flowchart of a process 900 for manufacturing a stator, such as the stator 56 shown in FIG. 3 and the portions thereof shown in FIGS. 4-8, in accordance with an exemplary embodiment. As depicted in FIG. 9, the process 900 begins with the step of providing a stator core (step 902). In a preferred embodiment, the stator core is provided as a stack lamination with a plurality of slots formed within the stator core such that the slots extend radially around an inner surface of the stator core. Also in a preferred embodiment, the stator corresponds to the stator 56 of FIGS. 3-8, and the plurality of slots corresponds to the slots 78 of FIGS. 3-7.

A plurality of conductors are provided with insulation (step 904). In a preferred embodiment, each conductor is surrounded by an insulating liner. In a preferred embodiment, the conductors correspond to the conductors 100 of FIGS. 3-8, and the insulation corresponds to the liners 95 of FIGS. 3-7. In one preferred embodiment, each conductor comprises a copper wire.

Before any insertion into the slots, the conductors are bent (step 906). In a preferred embodiment, each conductor is bent a number of times that is dependent upon the number of slots in which such conductor is to be inserted. In one preferred embodiment, each conductor is bent thirteen times so that each conductor can subsequently be inserted into four different slots in accordance with the exemplary embodiment of FIGS. 3-8.

The conductors are then coupled together (step 908). In a preferred embodiment, all conductors of a common phase are coupled together in a serial connection. Also in a preferred embodiment, the conductors are coupled together prior to any insertion into the slots.

The conductors are then inserted into corresponding slots (step 910). In a preferred embodiment, the conductors are slid into the corresponding slots through openings in the slots. Each conductor is preferably inserted into two or more corresponding slots, such that the conductor extends continuously through each of the corresponding slots. For example, in one preferred embodiment corresponding to the stator 56 of FIGS. 3-8, each conductor is inserted into four corresponding slots. However, one or more of the conductors may be placed within a different number of slots in different embodiments. Also in a preferred embodiment, the conductors are slid together into the corresponding slots in pairs, or two conductors at a time, for example as depicted in FIGS. 5-7. However, the number of conductors inserted together at a particular time may vary in different embodiments, for example depending on the size of the slots and the conductors used.

The conductors are then welded together after they are inserted into the slots (step 912). In a preferred embodiment, the conductors of a common phase are welded together at various welding locations along the stator. Also in a preferred embodiment, similar to the discussion above, the number of welding locations for the process 900 is reduced as compared with those required in a traditional stator. For example, in one preferred embodiment, the number of welding locations for the process 900 is close to one half of the number of the welding locations of a traditional stator having six conductors per slot.

Due to the reduced number of welding locations, the process 900 of FIG. 9, and the accompanying stator 56 and components thereof of FIGS. 3-8, can significantly reduce welding cost, time, effort, and any associated welding errors as compared with traditional stators. In addition, because conductors are disposed continuously in multiple slots, this also reduces the number of times that different conductors are coupled together, thereby also reducing the costs, time, and any associated errors of coupling the conductors together as compared with traditional stators. Moreover, the bending and coupling of the conductors before their placement into the corresponding openings can also reduce costs, time, effort, and any errors associated with the coupling of the conductors.

Accordingly, improved stators are provided with improved placement, bending, coupling, and/or welding of couplers. Improved methods are also provided for manufacturing such improved stators. Additionally, improved electric motors are provided that have such improved stators. The stators, methods, and electric motors can achieve savings in costs, time, and effort, and can be manufactured with fewer couplings, fewer welding locations, and potentially increased accuracy and precision.

It will be appreciated that the disclosed methods and systems may vary from those depicted in the Figures and described herein. For example, the conductors may be disposed in a different number of slots in various embodiments. In addition, it will be appreciated that certain steps of the process 900 may vary from those depicted in FIG. 9 and/or described herein in connection therewith. It will similarly be appreciated that certain steps of the process 900 may occur simultaneously or in a different order than that depicted in FIG. 9 and/or described herein in connection therewith. It will similarly be appreciated that the disclosed stators, methods, and electric motors may be implemented and/or utilized in connection with any number of different types of automobiles, sedans, sport utility vehicles, trucks, and/or any of a number of other different types of vehicles, among other possible applications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for manufacturing a stator, the method comprising the steps of:
    providing a stator core;
    forming a plurality of slots within the stator core;
    providing each of the plurality of conductors with a separate non-coating insulating liner that surrounds an outer portion of the conductor entirely; and
    sliding a plurality of conductors into a stator lamination of the stator core in a radial direction such that each conductor extends continuously through at least two of the plurality of slots, wherein the sliding of the plurality of conductors into the slots is performed after each of the plurality of conductors is provided with the insulating liner that surrounds the outer portion of the conductor.

2. The method of claim 1, further comprising the step of:
sliding a plurality of wires into the stator core such that each of the plurality of wires extends continuously through at least two of the plurality of slots.

3. The method of claim 2, wherein the step of sliding the plurality of wires into the stator core comprises the step of:
sliding the plurality of wires into the stator core such that each of the plurality of wires extends continuously through four of the plurality of slots.

4. The method of claim 2, further comprising the step of:
bending the plurality of wires prior to sliding the plurality of wires into the stator core.

5. The method of claim 4, wherein the step of bending the plurality of wires comprises the step of:
bending each of the plurality of wires in at least eight locations prior to sliding the plurality of wires into the stator core.

6. The method of claim 2, wherein the plurality of wires comprises a first plurality of wires of a first phase and a second plurality of wires of a second phase, and the method further comprises the steps of:
coupling the first plurality of wires with a first serial connection and the second plurality of wires with a second serial connection prior to sliding the plurality of wires into the stator core; and
welding the first plurality of wires and the second plurality of wires after sliding the plurality of wires into the stator core.

7. The method of claim 1, wherein the step of sliding the plurality of conductors comprises the step of sliding the plurality of conductors into a complete stator lamination of the stator core such that each conductor extends continuously through at least two of the plurality of slots.

8. The method of claim 1, wherein the stator lamination is already disposed within the stator core prior to the sliding of the plurality of conductors.

9. The method of claim 1, wherein the stator lamination is not bent after the sliding of the plurality of conductors.

10. The method of claim 1, wherein the step of sliding the plurality of conductors comprises the step of sliding the plurality of conductors into the stator lamination of the stator core such that each conductor extends continuously through at least two fully open slots of the plurality of slots.

11. The method of claim 10, wherein:
a first portion of the conductor extends through a first of the two fully open slots and is surrounded by a first liner; and
a second portion of the conductor extends through a second of the two fully open slots and is surrounded by a second liner that is separate from the first liner.

12. The method of claim 1, wherein each of the conductors has an outer most coating, and the insulating liner for each of the conductors surrounds the outer most coating for such conductor.

13. The method of claim 1, wherein the insulating liner surrounds only a portion of the conductor.

14. The method of claim 1, wherein the insulating liner surrounds only straight line portions of the conductor.

15. The method of claim 1, wherein the liner for each conductor is not physically part of the conductor.

16. The method of claim 1, wherein the liner for each conductor is separate from any coatings of the conductor.

17. The method of claim 1, wherein the liner for each conductor is shaped differently than the conductor.

18. The method of claim 1, wherein each liner surrounds a portion of two of the conductors.

19. The method of claim 1, wherein the step of sliding the plurality of conductors further comprises sliding the plurality of conductors into the stator lamination of the stator core such that each conductor extends continuously through at least two of the plurality of slots via an opening for each of the respective slots, wherein the opening for each respective slot has a width that is equal to a width of the respective slot.

20. The method of claim 1, wherein the insulating liner for each of the plurality of conductors comprises a slot liner that is provided to surround an outermost portion of the conductor before the sliding of the conductor into the slot.

* * * * *